United States Patent
Zhang et al.

(10) Patent No.: US 10,945,165 B2
(45) Date of Patent: Mar. 9, 2021

(54) UE REPORTED SRS SWITCHING CAPABILITY

(71) Applicant: Nokia Technologies Oy, Espoo (FI)

(72) Inventors: Li Zhang, Beijing (CN); Chunhai Yao, Beijing (CN)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 16/099,894

(22) PCT Filed: May 3, 2017

(86) PCT No.: PCT/FI2017/050340
§ 371 (c)(1),
(2) Date: Nov. 8, 2018

(87) PCT Pub. No.: WO2017/194829
PCT Pub. Date: Nov. 16, 2017

(65) Prior Publication Data
US 2019/0159080 A1    May 23, 2019

Related U.S. Application Data

(60) Provisional application No. 62/335,275, filed on May 12, 2016.

(51) Int. Cl.
*H04W 36/00* (2009.01)
*H04W 8/22* (2009.01)
(Continued)

(52) U.S. Cl.
CPC ......... *H04W 36/0061* (2013.01); *H04L 5/001* (2013.01); *H04L 5/0048* (2013.01);
(Continued)

(58) Field of Classification Search
CPC . H04W 36/0061; H04W 36/00; H04W 36/36; H04W 36/08; H04W 8/22;
(Continued)

(56) References Cited

U.S. PATENT DOCUMENTS

2012/0213154 A1* 8/2012 Gaal ................... H04B 7/0608
                                                                370/328
2014/0092877 A1   4/2014 Kazmi et al.
(Continued)

FOREIGN PATENT DOCUMENTS

EP         2 996 418 A1    3/2016
JP         2014511605 A    5/2014
(Continued)

OTHER PUBLICATIONS

"Reply LS on SRS carrier switching interruption time", 3GPP TSG-RAN WG4 Meeting #78bis, R4-163142, Apr. 2016, 1 pg.
(Continued)

*Primary Examiner* — Vinncelas Louis
(74) *Attorney, Agent, or Firm* — Harrington & Smith

(57) ABSTRACT

Methods, apparatuses, and computer software for UE reported sounding reference signal (SRS) switching capability are provided. A method may include receiving a request, from a base station, for a sounding reference signal (SRS) switching capability of a user equipment, wherein the request includes a list of possible cells to be used by the user equipment for SRS transmission; determining, at the user equipment, the SRS switching capability of the user equipment based on the list of possible cells; and transmitting, from the user equipment to the base station, an indication of the SRS switching capability of the user equipment.

20 Claims, 3 Drawing Sheets

402: transmitting, by a base station, a request for reference signal (SRS) switching capability of the user equipment, wherein the request comprises a list of possible cells to be used by user equipment for SRS transmission 404: in response to the request, receiving an indication of the SRS switching capability of the user equipment for the list of cells 404: transmitting a configuration for SRS transmission including an indication of transmission resources to the user equipment based at least on the SRS switching capability of the user equipment

(51) Int. Cl.
  *H04L 5/00* (2006.01)
  *H04L 25/02* (2006.01)
  *H04W 36/08* (2009.01)
  *H04W 36/36* (2009.01)
(52) U.S. Cl.
  CPC .............. *H04L 25/02* (2013.01); *H04W 8/22* (2013.01); *H04W 36/08* (2013.01); *H04W 36/36* (2013.01)
(58) Field of Classification Search
  CPC ....... H04L 5/001; H04L 25/02; H04L 5/0048; H04L 5/0078; H04B 7/0608
  See application file for complete search history.

(56) References Cited

U.S. PATENT DOCUMENTS

| | | | |
|---|---|---|---|
| 2014/0169343 A1 | 6/2014 | Skov et al. | 370/336 |
| 2014/0369242 A1 | 12/2014 | Ng et al. | 370/280 |
| 2016/0143035 A1* | 5/2016 | Xue | H04L 5/001 370/329 |
| 2017/0302419 A1* | 10/2017 | Liu | H04L 5/0078 |

FOREIGN PATENT DOCUMENTS

| | | |
|---|---|---|
| WO | WO-2012/116091 A1 | 8/2012 |
| WO | WO-2016/029864 A1 | 3/2016 |

OTHER PUBLICATIONS

"Specification Impacts to Support SRS Carrier based Switching", Huawei, HiSilicon, 3GPP TSG RAN WG1 Meeting #84bis, R1-162586, Apr. 2016, 4 pgs.

"On General Operation of SRS Carrier Based Switching", Ericsson, 3GPP TSG-RAN WG1 Meeting #84bis, R1-162769, Apr. 2016, 3 pgs.

Huawei et al.; "General Operation of SRS Carrier Based Switching"; R1-162585; 3GPP TSG RAN WG1 Meeting #84bis; Busan, Korea; Apr. 11-15, 2016; whole document (5 pages).

* cited by examiner

| UE RF chain 202/SRS switching group 1 | Configured DL cells | Configured UL cells |
|---|---|---|
| | CC1 | CC1 |
| | CC2 | |
| | CC3 | |
| UE RF chain 204/SRS switching group 2 | CC4 | CC2 |
| | CC5 | |
| | | |

302: receiving a request, from a base station, for a sounding reference signal (SRS) switching capability of a user equipment, wherein the request comprises a list of possible cells to be used by user equipment for SRS transmission

304: determining the SRS switching capability of the user equipment based on the list of possible cells

306: transmitting, to the base station, an indication of the SRS switching capability of the user equipment

FIG. 3

402: transmitting, by a base station, a request for reference signal (SRS) switching capability of the user equipment, wherein the request comprises a list of possible cells to be used by user equipment for SRS transmission

404: in response to the request, receiving an indication of the SRS switching capability of the user equipment for the list of cells

404: transmitting a configuration for SRS transmission including an indication of transmission resources to the user equipment based at least on the SRS switching capability of the user equipment

FIG. 4

UE REPORTED SRS SWITCHING CAPABILITY

This patent application is a U.S. National Stage application of International Patent Application Number PCT/FI2017/050340 filed May 3, 2017, and claims priority to U.S. 62/335,275 filed May 12, 2016 which are hereby incorporated by reference in their entireties.

TECHNICAL FIELD

This invention relates generally to wireless communications and, more specifically, relates to UE reported sounding reference signal (SRS) switching capability.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Typically, a user equipment (UE) in a wireless network, such as a Long-Term Evolution (LTE) network, may transmit sounding reference signals to a base station so that the base station can estimate the uplink channel link quality over a wide bandwidth. The base station may use this information to help schedule the user equipment for uplink frequency selective scheduling and perform beamforming for downlink scheduling considering the channel reciprocity of time division duplexing (TDD) system.

BRIEF SUMMARY

This section is intended to include examples and is not intended to be limiting.

In an example of an embodiment, a method is disclosed that includes receiving a request, from a base station, for a sounding reference signal (SRS) switching capability of a user equipment, wherein the request comprises a list of possible cells to be used by the user equipment for SRS transmission; determining, at the user equipment, the SRS switching capability of the user equipment based on the list of possible cells; and transmitting, from the user equipment to the base station, an indication of the SRS switching capability of the user equipment.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receive a request, from a base station, for a sounding reference signal (SRS) switching capability of a user equipment, wherein the request comprises a list of possible cells to be used by the user equipment for SRS transmission; determine, at the user equipment, the SRS switching capability of the user equipment based on the list of possible cells; and transmit, from the user equipment to the base station, an indication of the SRS switching capability of the user equipment.

In another example of an embodiment, an apparatus comprises means for receiving a request, from a base station, for a sounding reference signal (SRS) switching capability of a user equipment, wherein the request comprises a list of possible cells to be used by the user equipment for SRS transmission; means for determining, at the user equipment, the SRS switching capability of the user equipment based on the list of possible cells; and means for transmitting, from the user equipment to the base station, an indication of the SRS switching capability of the user equipment.

In an example of an embodiment, a method is disclosed that includes transmitting, by a base station, a request for reference signal (SRS) switching capability of the user equipment, wherein the request comprises a list of possible cells to be used by user equipment for SRS transmission; in response to the request, receiving an indication at the base station of the SRS switching capability of the user equipment for the list of cells; and transmitting, from the base station, a configuration for SRS transmission including an indication of transmission resources to the user equipment based at least on the SRS switching capability of the user equipment.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform: transmit, by a base station, a request for reference signal (SRS) switching capability of the user equipment, wherein the request comprises a list of possible cells to be used by user equipment for SRS transmission; in response to the request, receive an indication at the base station of the SRS switching capability of the user equipment for the list of cells; and transmit, from the base station, a configuration for SRS transmission including an indication of transmission resources to the user equipment based at least on the SRS switching capability of the user equipment.

In another example of an embodiment, an apparatus comprises means for transmitting, by a base station, a request for reference signal (SRS) switching capability of the user equipment, wherein the request comprises a list of possible cells to be used by user equipment for SRS transmission; in response to the request, means for receiving an indication at the base station of the SRS switching capability of the user equipment for the list of cells; and means for transmitting, from the base station, a configuration for SRS transmission including an indication of transmission resources to the user equipment based at least on the SRS switching capability of the user equipment.

BRIEF DESCRIPTION OF THE DRAWINGS

In the attached Drawing Figures:

FIGS. 3 and 4 are logic flow diagrams for UE reported sounding reference signal (SRS) switching capability, and illustrates the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for UE reported SRS switching capability. Additional description of these techniques is presented after a system into which the exemplary embodiments may be used is described.

Figure 1:
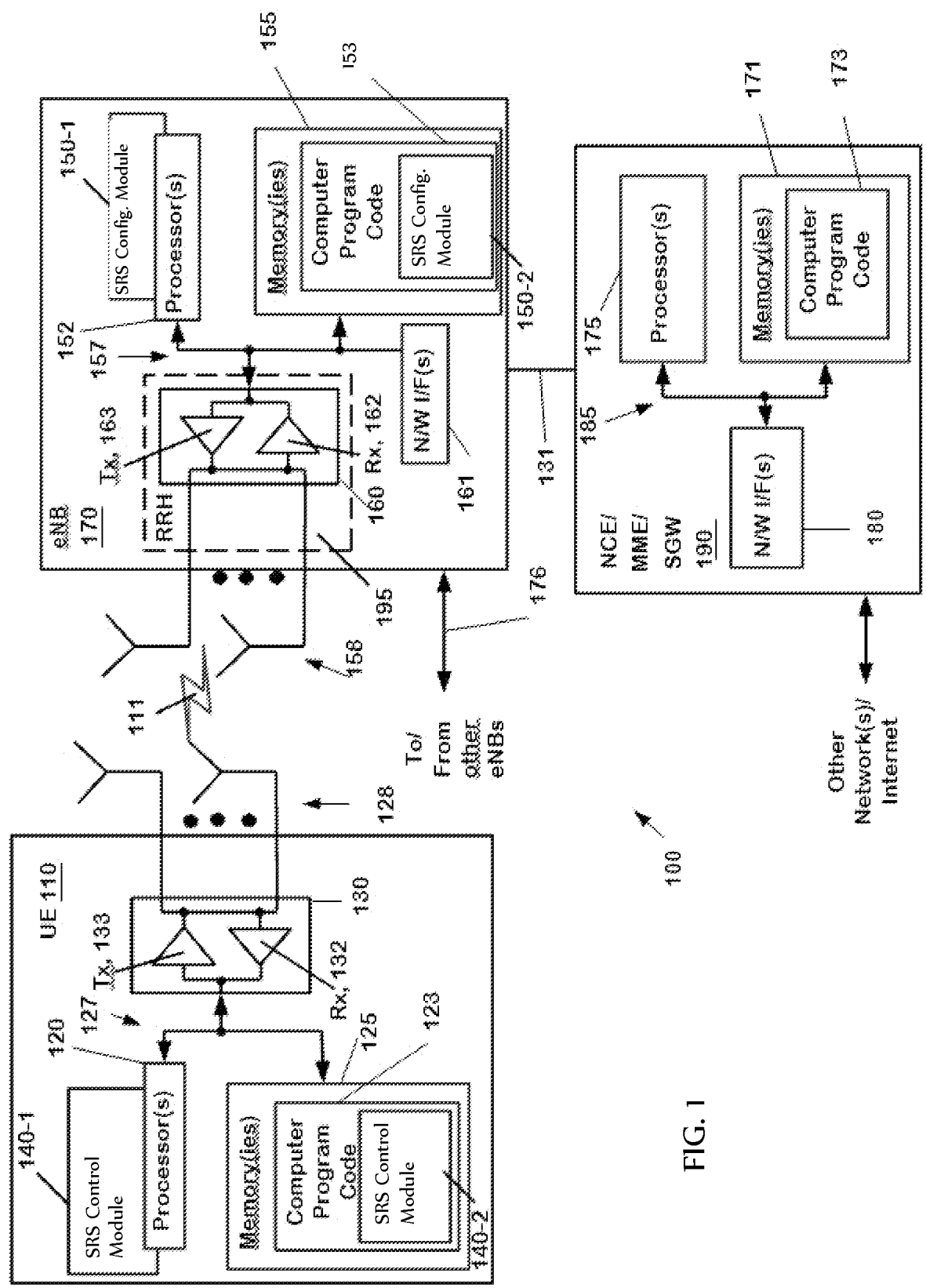
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a SRS control module 140, comprising one of or both parts 140-1 and/or 140-2, which may be implemented in a number of ways. The SRS control module 140 may be implemented in hardware as SRS control module 140-1, such as being implemented as part of the one or more processors 120. The SRS control module 140-1 may be implemented also as an integrated circuit or through other hardware such as a programmable gate array. In another example, the SRS control module 140 may be implemented as SRS control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB 170 is a base station that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a SRS configuration module 150, comprising one of or both parts 150-1 and/or 150-2, which may be implemented in a number of ways. The SRS configuration module 150 may be implemented in hardware as SRS configuration module 150-1, such as being implemented as part of the one or more processors 152. The SRS configuration module 150-1 may be implemented also as an integrated circuit or through other hardware such as a programmable gate array. In another example, the SRS configuration module 150 may be implemented as SRS configuration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Exemplary embodiments described herein provide a solution for including an indication of UE SRS switching capability, in order to support base station configuration for each specific SRS switching (e.g. for SRS transmission on a DL-only SCell).

Generally, carrier aggregation involves more DL carriers than UL carriers due to increased complexity of the user equipment. For example, the user equipment has a larger number of transmitter chains including PAs. According to the current 3GPP specification, SRS may only be transmitted in the configured UL carriers, thus DL carriers without a paired UL carrier will not reap the benefits of the SRS, namely, CSI based on the channel reciprocity between UL and DL. For TDD, this situation may be even worse since CA can have up to 32 component carriers. Allowing fast SRS carrier switching among TDD DL carriers may improve the DL beamforming performance.

The term component carrier is used herein to describe a carrier on which a user equipment has a serving cell (e.g. a PCell or a SCell).

The work item for "SRS Carrier based Switching for LTE" was recently approved [see specifically document RP-160676 by Huawei, HiSilicon entitled "New WI proposal: SRS Carrier Based Switching for LTE"; 3GPP TSG RAN Meeting #71; Gotenborg, Sweden; 7-10 Mar. 2016]. One objective of the work item is to provide support for a UE to transmit SRS on more component carriers than those configured for PUSCH transmission, i.e., beyond UE UL CA capability. The motivation is to allow utilization of TDD channel reciprocity, so that beamforming can be used for DL transmission on the DL-only component carriers. As the SRS transmission is beyond UE UL CA capability, it must be determined how to switch the RF chain between UL serving carrier (for which PUSCH is configured) and the SRS carrier (for which PUSCH is not configured). One issue for supporting this SRS switching is determining the switching-from carrier and switching-to carrier. For example, assume a UE has two TX chains and is configured for PCell and SCell1 with UL. If the UE needs to switch one of TX chains to SCell2 (DL-only SCell) for SRS transmission, then it must be determined which TX chain is to be used.

Currently, there is one proposal to define a priority rule indicating which TX chain should be used for a specific switching, mainly based on the different switching/interruption time by using different TX chains (see document R1-162769 entitled "On General Operation of SRS Carrier Based Switching" by Ericsson; 3GPP TSG-RAN WG1 Meeting #84bis Busan, Korea, 11-15 Apr. 2016). Another proposal leaves the selection to eNB configuration/indication (see document R1-162586 entitled "Specification Impacts to Support SRS Carrier based Switching" by Huawei, HiSilicon; 3GPP TSG RAN WG1 Meeting #84bis Busan, Korea, Apr. 11-15, 2016).

Neither of the above proposals consider that, depending on UE implementation, one TX chain may not be able to cover all frequency ranges, and with such restriction, it may be unclear between the UE and eNB on which chain is used for a specific SRS switching, or the eNB indication may be invalid, thus conflicting with the UE TX chain capability.

According to exemplary embodiments, the following three steps may be performed:

1. eNB requests a UE to report its SRS switching capability. The eNB may request the UE to reports its SRS switching capability, for example, by transmitting a request message to the UE which includes a list of SCells for which UE is expected to transmit SRS. The list of secondary cells may be denoted as "switch-to cells", as the list includes possible cells for which the UE switches to and transmit SRS on.

2. The UE reports its switching capability to the eNB via RRC signaling.

3. eNB indicates the configuration of the SRS transmission for each DL-only SCell via RRC signaling according to the received UE capability. The SRS configuration may include SRS common configuration and SRS dedicated configuration for periodic and/or aperiodic SRS triggering. For example, common configuration includes cell-specific parameters that apply for all UEs in the cell, and dedicated configuration includes UE-specific parameters that apply for a specific UE. The SRS configuration may include, for example, the time/frequency resources, power control parameters and timing control parameters for the SRS transmission.

According to an exemplary embodiment, the UE can report its SRS switching capability on a per secondary cell basis. For example, in response to receiving the message, the UE provides feedback on its SRS switching capability for each of the SCells included in the request message. The feedback may be based on the UE's RF implementation, or timing difference between the switching-from and switching-to carrier. Some non-limiting examples of different UE RF implementations may be: one TX/RX chain; two or more TX/RX chains; or two Rx chains but only has one TX chain. The RF implementation also may include the association between RF chains and RF chipset. For example, with some implementations all RF chains are associated with one RF chipset; with other implementations, each RF chain has its own RF chipset.

The UE's SRS switching capability feedback may include, but is not limited to, the following parameters:
whether switching to a given SCell is possible; and
if switching to the given SCell is possible, the interruption time (including switching time and SRS transmission time) for UL and DL, respectively, for each configured serving cell, as seen from the serving cell.

In this embodiment, the selection of TX chain for any specific SRS switching may be made by the user equipment, as the user equipment is in best position to know its own RF implementation and the timing relationships between its serving cells.

According to another embodiment, the UE can report its SRS switching capability on a group basis, e.g., a SRS switching cell group. The feedback may include one or more SRS switching cell groups and the cells in each group (e.g. Group 1, including CC1, CC2, . . . ); or the bands in each group (e.g. Group 1, including band 1, band 2 . . . ). The feedback may include, for example: the cells or supported bands within the same RF TX chain; and an indication that switching between SCells in the same group leads to longer interruption time as compared to switching between SCells in different groups. If the reported SRS switching cell group is per band, the cells supported in the band may be in the same SRS switching cell group. The grouping can be at least done according to TX chain capability (e.g., the cells supported by TX chain 1 form Group 1, cells supported by TX chain 2 form Group 2, etc.). Accordingly, the number of SRS switching cell groups may be determined, for example, by the number of UE RF TX chains. It should be understood that other grouping criteria may also be used according to UE implementation, as long as there are different impacts to serving cells if switching is within one group and if switching is across groups.

If the configured downlink Scell(s) do not belong to any SRS switching cell group, eNB may assume the UE does not support SRS switching to the related Scell(s). The feedback with SRS switching cell group is sent by RRC signaling, such as the response to the SRS capability request.

Figures 2A, 2B:
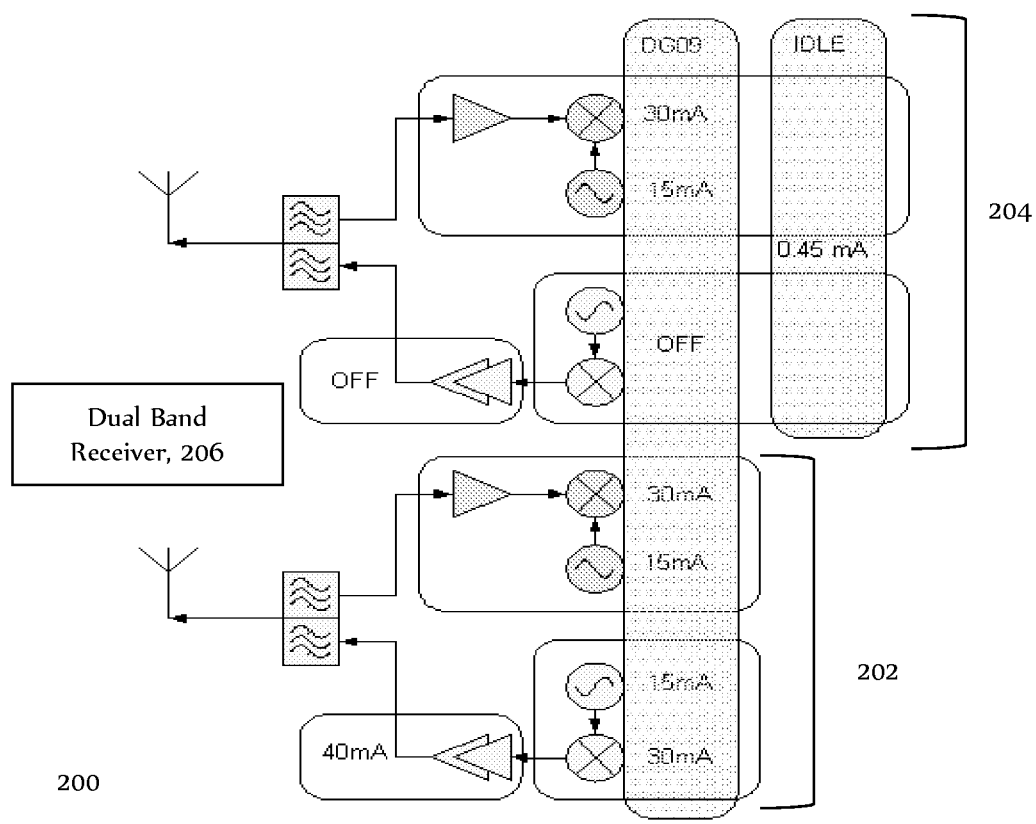
FIGS. 2A-2B shows an example carrier aggregation user equipment implementation according to exemplary embodiments.

Referring to FIGS. 2A-2B, FIG. 2A shows an example dual band receiver 206 of a user equipment 200, which may be the UE 110 of FIG. 1. The user equipment 200 has two RF chains 202, 204. FIG. 2B shows a table showing DL/UL cells configured for each of the RF chains 202, 204. As shown in the table of FIG. 2B, SRS switching group 1 is defined for RF chain 202, where: CC1, CC2, and CC3 are configured as DL cells; and CC1 is configured as an UL cell. SRS witching group 2 is defined for RF chain 202, where: CC4 and CC5 are configured as DL cells; and CC2 is configured as an UL cell.

According to FIG. 2, the user equipment 200 is a non-UL CA capable UE, since it does not have power amplifier (PA) in the RF chain 204. Thus, the user equipment 200 cannot transmit a sounding reference signal corresponding to the configured downlink cells in SRS switching group 2 (i.e. CC4 and CC5). The user equipment 200 has PA in RF chain 1, and therefore the user equipment 200 can switch to/from a cell that is configured for RF chain 202, e.g., CC1, CC2, and CC3. As described above, the user equipment may report the SRS switching cell groups to the eNB, and doing so allows the eNB to know which SRS switching groups the UE supports. In case UE reports supporting multiple SRS switching cell groups, eNB can trigger the UE SRS transmission alternatively among the cells in different SRS switching groups. It is noted that, SRS switching in the same cell group generally causes longer interruption time.

FIG. 3 is a logic flow diagram for UE reported SRS switching capability. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the SRS control module 140 may include multiples ones of the blocks in FIG. 3, where each included block is an interconnected means for performing the function in the block. The blocks in FIG. 3 are assumed to be performed by the UE 110, e.g., under control of the SRS control module 140 at least in part.

Referring to FIG. 3, an example method may comprise: receiving a request, from a base station, for a sounding reference signal (SRS) switching capability of a user equipment, wherein the request may include a list of possible cells to be used by user equipment for SRS transmission as indicated by 302; determining the SRS switching capability of the user equipment based on the list of possible cells as indicated by 304; and transmitting, to the base station, an indication of the SRS switching capability of the user equipment as indicated by 306.

The indication of the SRS switching capability may include SRS switching capability information for each cell in the list. The SRS switching capability information may include at least one parameter indicating whether the user equipment is capable of switching to a given cell in the list. The SRS switching capability information may include, for each cell in the list: an interruption time on uplink transmission and an interruption time on downlink reception for each serving cell of the user equipment, wherein the interruption time may include at least: a switching time and a SRS transmission time for the given cell in the list; and the downlink timing difference between each of the serving cells and the given cell in the list. The indication of the SRS switching capability may include: at least one group of cells from the list that the user equipment supports for SRS switching, and an identifier of each cell in the at least one group or each band in the at least one group. The indication of the SRS switching capability may include a first group of cells and a second group of cells, wherein SRS switching between cells in the first group may have a larger impact e.g. longer interruption time) to serving cells of the user equipment than SRS switching between cells in the first group and cells in the second group of cells. The method may further include: receiving a SRS transmission configuration for each cell in the list according to the SRS switching capability of the user equipment; and transmitting a sounding reference signal according to the received SRS transmission configuration.

An example embodiment may be provided in an apparatus comprising at least one processor; and at least one non-transitory memory including computer program code, the at least one memory and the computer program code configured to, with the at least one processor, cause the apparatus to: receive a request, from a base station, for a sounding reference signal (SRS) switching capability of a user equipment, wherein the request may include a list of possible cells to be used by user equipment for SRS transmission; determine the SRS switching capability of the user equipment based on the list of possible cells; and transmit, to the base station, an indication of the SRS switching capability of the user equipment.

The indication of the SRS switching capability may include SRS switching capability information for each cell in the list. The SRS switching capability information may include at least one parameter indicating whether the user equipment is capable of switching to a given cell in the list. The SRS switching capability information may include, for each cell in the list: an interruption time on uplink transmission and an interruption time on downlink reception for each serving cell of the user equipment, wherein the interruption time may include at least: a switching time and a SRS transmission time for the given cell in the list; and the downlink timing difference between each of the serving cells and the given cell in the list. The indication of the SRS switching capability may include: at least one group of cells from the list that the user equipment supports for SRS switching, and an identifier of each cell in the at least one group or each band in the at least one group. The indication of the SRS switching capability may include a first group of cells and a second group of cells, wherein SRS switching between cells in the first group may have a larger impact (e.g. longer interruption time) to serving cells of the user equipment than SRS switching between cells in the first group and cells in the second group of cells. The at least one memory and the computer program code may be configured to, with the at least one processor, cause the apparatus to: receive a SRS transmission configuration for each cell in the list according to the SRS switching capability of the user equipment; and transmit a sounding reference signal according to the received SRS transmission configuration.

An example embodiment may be provided in a non-transitory program storage device, such as memory 125 shown in FIG. 1 for example, readable by a machine, tangibly embodying a program of instructions executable by the machine for performing operations, the operations comprising: receiving a request, from a base station, for a sounding reference signal (SRS) switching capability of a user equipment, wherein the request may include a list of possible cells to be used by user equipment for SRS transmission; determining the SRS switching capability of the user equipment based on the list of possible cells; and transmitting, to the base station, an indication of the SRS switching capability of the user equipment.

FIG. 4 is a logic flow diagram for UE reported SRS switching capability. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the SRS configuration module 150 may include multiples ones of the blocks in FIG. 4, where each included block is an interconnected means for performing the function in the block. The blocks in FIG. 4 are assumed to be performed by a base station such as eNB 170, e.g., under control of the SRS configuration module 150 at least in part.

Referring to FIG. 4, an example method may comprise transmitting, by a base station, a request for reference signal (SRS) switching capability of the user equipment, wherein the request may include a list of possible cells to be used by user equipment for SRS transmission as indicated by block 402; in response to the request, receiving an indication of the SRS switching capability of the user equipment for the list of cells as indicted by block 404; and transmitting a configuration for SRS transmission including an indication of transmission resources to the user equipment based at least on the SRS switching capability of the user equipment as indicated by block 406.

The indication of the SRS switching capability comprises SRS switching capability information for each cell in the list. The SRS switching capability information comprises at least one parameter indicating whether the user equipment is capable of switching to a given cell in the list. The SRS switching capability information may include, for each cell in the list: an interruption time on uplink transmission and an interruption time on downlink for each serving cell, wherein the interruption time may include at least a switching time and a SRS transmission time for the given cell in the list; and the downlink timing difference between each serving cell and the concerned the given cell in the list. The indication of the SRS switching capability may include: at least one group of cells from the list of possible cells that the user equipment supports for SRS switching, and an identifier of each cell in the at least one group or each band in the at least one group. The indication may include a first group of cells and a second group of cells, wherein SRS switching between cells in the first group may have a larger impact (e.g. longer interruption time) to serving cells of the user equipment than SRS switching between cells in the first group and cells in the second group of cells.

An example embodiment may be provided in an apparatus comprising at least one processor; and at least one non-transitory memory including computer program code, the at least one memory and the computer program code configured to, with the at least one processor, cause the apparatus to: transmit, by a base station, a request for reference signal (SRS) switching capability of the user equipment, wherein the request may include a list of possible cells to be used by user equipment for SRS transmission; in response to the request, receive an indication of the SRS switching capability of the user equipment for the list of cells; and transmit a configuration for SRS transmission including an indication of transmission resources to the user equipment based at least on the SRS switching capability of the user equipment.

The indication of the SRS switching capability may include SRS switching capability information for each cell in the list. The SRS switching capability information may include at least one parameter indicating whether the user equipment is capable of switching to a given cell in the list. The SRS switching capability information may further include, for each cell in the list: an interruption time on uplink transmission and an interruption time on downlink for each serving cell, wherein the interruption time comprises at least a switching time and a SRS transmission time for the given cell in the list; and the downlink timing difference between each serving cell and the concerned the given cell in the list. The indication of the SRS switching capability may include: at least one group of cells from the list of possible cells that the user equipment supports for SRS switching, and an identifier of each cell in the at least one group or each band in the at least one group. The indication may include a first group of cells and a second group of cells, wherein SRS switching between cells in the first group may have a larger impact (e.g. longer interruption time) to serving cells of the user equipment than SRS switching between cells in the first group and cells in the second group of cells.

An example embodiment may be provided in a non-transitory program storage device, such as memory 155 shown in FIG. 1 for example, readable by a machine, tangibly embodying a program of instructions executable by the machine for performing operations, the operations transmitting, by a base station, a request for reference signal (SRS) switching capability of the user equipment, wherein the request may include a list of possible cells to be used by user equipment for SRS transmission; in response to the request, receiving an indication of the SRS switching capability of the user equipment for the list of cells; and transmitting a configuration for SRS transmission including an indication of transmission resources to the user equipment based at least on the SRS switching capability of the user equipment.

According to embodiments described herein, there is no need for TX chain level configuration or prioritization (which is usually seen as UE proprietary implementation), as the eNB is provided information regarding the interruption to each serving cell and the UE SRS switching capability. This also allows for the eNB to provide optimal configuration of SRS transmission subframes/symbols based on the UE capability reporting, so that the interruption due to switching can be minimized.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

DL downlink
CA Carrier Aggregation
CC Component Carrier
CSI Channel State Information
eNB (or eNodeB) evolved Node B (e.g., an LTE base station)
I/F interface
LTE long term evolution
MME mobility management entity
NCE network control element
N/W network
PA Power Amplifier
PCell Primary Cell
PRACH Physical Random Access Channel
PUCCH Physical Uplink Control Channel
PUSCH Physical Uplink Shared Channel
RRC Radio Resource Control
RRH remote radio head
Rx receiver
SCell Secondary Cell
SGW serving gateway
SRS Sounding Reference Signal
Tx transmitter
UE user equipment (e.g., a wireless, typically mobile device)
UL uplink

The invention claimed is:

1. A method comprising:

receiving a request, from a base station, for a sounding reference signal switching capability of a user equipment, wherein the request comprises a list of possible cells to be used by the user equipment for sounding reference signal transmission;

determining, at the user equipment, the sounding reference signal switching capability of the user equipment based on the list of possible cells;

transmitting, from the user equipment to the base station, an indication of the sounding reference signal switching capability of the user equipment; and receiving, at the user equipment and from the base station, indication of configuration of sounding reference signal transmissions for downlink-only secondary cells according to at least the signal switching capability of the user equipment.

2. The method of claim 1, wherein the indication of the sounding reference signal switching capability comprises sounding reference signal switching capability information for each cell in the list.

3. The method of claim 1, wherein the sounding reference signal switching capability information comprises at least one parameter indicating whether the user equipment is capable of switching to a given cell in the list.

4. The method of claim 1, wherein, for each cell in the list, the sounding reference signal switching capability information comprises:

an interruption time on uplink transmission and an interruption time on downlink reception for each serving cell of the user equipment, wherein the interruption time comprises at least: a switching time and a sounding reference signal transmission time for the given cell in the list; and the downlink timing difference between each of the serving cells and the given cell in the list.

5. The method of claim 1, wherein the indication of the sounding reference signal switching capability comprises:

at least one group of cells from the list that the user equipment supports for sounding reference signal switching, and an identifier of each cell in the at least one group or each band in the at least one group.

6. The method of claim 5, wherein the indication comprises a first group of cells and a second group of cells, wherein sounding reference signal switching between cells in the first group has a larger impact to serving cells of the user equipment than sounding reference signal switching between cells in the first group and cells in the second group of cells.

7. The method of claim 1, further comprising:
receiving a sounding reference signal transmission configuration for at least one cell according to the sounding reference signal switching capability of the user equipment; and
transmitting a sounding reference signal according to the received sounding reference signal transmission configuration.

8. An apparatus comprising:
at least one processor; and
at least one memory including computer program code,
wherein the at least one memory and the computer program code are configured to, with the at least one processor, cause the apparatus at least to perform:
receive a request, from a base station, for a sounding reference signal switching capability of a user equipment, wherein the request comprises a list of possible cells to be used by user equipment for sounding reference signal transmission;
determine the sounding reference signal switching capability of the user equipment based on the list of possible cells;
transmit, to the base station, an indication of the sounding reference signal switching capability of the user equipment; and
receiving, at the user equipment and from the base station, indication of configuration of sounding reference signal transmissions for downlink-only secondary cells according to at least the signal switching capability of the user equipment.

9. The apparatus of claim 8, wherein the indication of the sounding reference signal switching capability comprises sounding reference signal switching capability information for each cell in the list.

10. The apparatus of claim 8, wherein the sounding reference signal switching capability information comprises at least one parameter indicating whether the user equipment is capable of switching to a given cell in the list.

11. The apparatus of claim 8, wherein, for each cell in the list, the sounding reference signal switching capability information further comprises:
an interruption time on uplink transmission and an interruption time on downlink reception for each serving cell of the user equipment, wherein the interruption time comprises at least: a switching time and a sounding reference signal transmission time for the given cell in the list; and
the downlink timing difference between each of the serving cells and the given cell in the list.

12. The apparatus of claim 8, wherein the indication of the sounding reference signal switching capability comprises:
at least one group of cells from the list that the user equipment supports for sounding reference signal switching, and
an identifier of each cell in the at least one group or each band in the at least one group.

13. The apparatus of claim 12, wherein the indication comprises a first group of cells and a second group of cells, wherein sounding reference signal switching between cells in the first group has a larger impact to serving cells of the user equipment than sounding reference signal switching between cells in the first group and cells in the second group of cells.

14. The apparatus of claim 8, wherein the at least one memory and the computer program code are further configured to, with the at least one processor, cause the apparatus to:
receive a sounding reference signal transmission configuration for at least one cell according to the sounding reference signal switching capability of the user equipment; and
transmit a sounding reference signal according to the received sounding reference signal transmission configuration.

15. An apparatus comprising:
at least one processor; and
at least one memory including computer program code,
wherein the at least one memory and the computer program code are configured to, with the at least one processor, cause the apparatus at least to perform:
transmit a request for sounding reference signal switching capability of the user equipment, wherein the request comprises a list of possible cells to be used by user equipment for sounding reference signal transmission;
in response to the request, receive an indication of the sounding reference signal switching capability of the user equipment for the list of cells; and
transmit to the user equipment a configuration for sounding reference signal transmission including an indication of configuration of transmission resources for downlink-only secondary cells based at least on the sounding reference signal switching capability of the user equipment.

16. The apparatus of claim 15, wherein the indication of the sounding reference signal switching capability comprises sounding reference signal switching capability information for each cell in the list.

17. The apparatus of claim 15, and wherein the sounding reference signal switching capability information comprises at least one parameter indicating whether the user equipment is capable of switching to a given cell in the list.

18. The apparatus of claim 15, wherein for each cell in the list, the sounding reference signal switching capability information further comprises:
an interruption time on uplink transmission and an interruption time on downlink for each serving cell, wherein the interruption time comprises at least a switching time and a sounding reference signal transmission time for the given cell in the list; and
the downlink timing difference between each serving cell and the concerned switch-to cell.

19. The apparatus of claim 15, wherein the indication comprises a first group of cells and a second group of cells, wherein sounding reference signal switching between cells in the first group has a larger impact to serving cells of the user equipment than sounding reference signal switching between cells in the first group and cells in the second group of cells.

20. The apparatus of claim 15, wherein the at least one memory and the computer program code are further configured to, with the at least one processor, cause the apparatus to:
transmit a sounding reference signal transmission configuration for at least one cell according to the sounding reference signal switching capability of the user equipment; and receive a sounding reference signal according to the transmitted sounding reference signal transmission configuration.

<p style="text-align:center">* * * * *</p>